(12) United States Patent
Liebert et al.

(10) Patent No.: US 11,606,845 B2
(45) Date of Patent: Mar. 14, 2023

(54) INDUCTION HEATING SYSTEMS HAVING CLOSE PROXIMITY COMMUNICATION DEVICES

(71) Applicant: ILLINOIS TOOL WORKS INC., Glenview, IL (US)

(72) Inventors: Scott Liebert, Freedom, WI (US); Anthony Salsich, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 799 days.

(21) Appl. No.: 16/297,345

(22) Filed: Mar. 8, 2019

(65) Prior Publication Data
US 2019/0297682 A1    Sep. 26, 2019

Related U.S. Application Data

(60) Provisional application No. 62/646,615, filed on Mar. 22, 2018.

(51) Int. Cl.
*H05B 6/10* (2006.01)
*B23K 9/095* (2006.01)
(Continued)

(52) U.S. Cl.
CPC ............ *H05B 6/101* (2013.01); *B23K 9/095* (2013.01); *B23K 26/34* (2013.01); *H04B 5/0031* (2013.01); *H04W 4/80* (2018.02); *H05B 6/06* (2013.01)

(58) Field of Classification Search
CPC ...... H05B 6/101; H04B 5/0031; B23K 9/095; B23K 26/34
(Continued)

(56) References Cited

U.S. PATENT DOCUMENTS 8,038,931 B1  10/2011  Thomas
8,350,196 B2  1/2013  Buchanan
(Continued)

FOREIGN PATENT DOCUMENTS

CN      106993346      7/2017

OTHER PUBLICATIONS

International Search Report and Written Opinion, issued in connection with International Patent Application No. PCT/US/2019/023620, dated Jun. 24, 2019, 16 pages.

*Primary Examiner* — Thien S Tran
(74) *Attorney, Agent, or Firm* — McAndrews, Held & Malloy, Ltd.

(57) ABSTRACT

Apparatuses, systems, and/or methods for providing an induction heating system are disclosed. The induction heating system includes an induction power supply and an induction heating tool configured to receive induction-type power from the induction power supply through one or more ports. The ports may be part of the induction power supply and/or an associated junction box. The induction heating tool may include a heating coil attached to one or more plugs via one or more cables. The ports of the induction power supply and/or junction box are configured to receive the plugs of the induction heating tool. A communication device may be positioned adjacent the ports. The communication device may be configured to read data from one or more memory devices of the induction heating tool (e.g., in/on the plugs) via close proximity communication.

19 Claims, 5 Drawing Sheets

(51) Int. Cl.
*H04W 4/80* (2018.01)
*H04B 5/00* (2006.01)
*B23K 26/34* (2014.01)
*H05B 6/06* (2006.01)

(58) Field of Classification Search
USPC .................. 219/130.21, 132, 620, 626, 627
See application file for complete search history.

(56) References Cited

U.S. PATENT DOCUMENTS

| | | | |
|---|---|---|---|
| 10,225,890 B2 | 3/2019 | Bourke, III | |
| 2001/0025847 A1 | 10/2001 | Bickel | |
| 2004/0084443 A1* | 5/2004 | Ulrich | H05B 6/36 |
| | | | 219/672 |
| 2010/0081375 A1 | 4/2010 | Rosenblatt | |
| 2012/0160897 A1* | 6/2012 | Enyedy | B23K 9/125 |
| | | | 228/8 |
| 2013/0264319 A1* | 10/2013 | Temby | B23K 9/323 |
| | | | 219/130.1 |
| 2014/0231415 A1 | 8/2014 | Verhagen | |
| 2014/0266576 A1* | 9/2014 | Hillen | B23K 9/32 |
| | | | 340/5.2 |
| 2014/0299595 A1 | 10/2014 | Sherrill | |
| 2015/0034629 A1* | 2/2015 | Sherrill | F16L 55/26 |
| | | | 219/644 |
| 2015/0083710 A1 | 3/2015 | Albrecht | |
| 2015/0334780 A1 | 11/2015 | Beistle | |
| 2015/0334781 A1 | 11/2015 | Verhagen | |
| 2015/0334782 A1 | 11/2015 | Garvey | |
| 2015/0334783 A1 | 11/2015 | Mlnarik | |
| 2015/0334784 A1 | 11/2015 | Carter | |
| 2016/0014850 A1 | 1/2016 | Verhagen | |
| 2016/0034629 A1* | 2/2016 | Sung | G06F 30/392 |
| | | | 716/119 |
| 2016/0073452 A1 | 3/2016 | Fanetti | |
| 2016/0105933 A1 | 4/2016 | Jones | |
| 2016/0105934 A1 | 4/2016 | Jones | |
| 2016/0105935 A1 | 4/2016 | Jones | |
| 2016/0175970 A1* | 6/2016 | Denis | B23K 9/124 |
| | | | 219/130.1 |
| 2016/0175972 A1 | 6/2016 | Denis | |
| 2016/0183330 A1 | 6/2016 | Sigl | |
| 2016/0278168 A1* | 9/2016 | Bourke, III | H05B 6/062 |
| 2018/0049277 A1* | 2/2018 | Salsich | H04B 3/54 |

* cited by examiner

INDUCTION HEATING SYSTEMS HAVING CLOSE PROXIMITY COMMUNICATION DEVICES

CROSS REFERENCE TO RELATED APPLICATIONS

This application claims the benefit of U.S. Provisional Patent Application No. 62/646,615, entitled "INDUCTION Heating SYSTEMS HAVING CLOSE PROXIMITY COMMUNICATION DEVICES," having a filing date of Mar. 22, 2018, the entirety of which is incorporated herein by reference.

TECHNICAL FIELD

The present disclosure generally relates to induction heating systems and, more particularly, to induction heating systems having close proximity communication devices.

BACKGROUND

Induction heating refers to a method for producing heat in a localized area on a susceptible (typically metal) object. Induction heating involves applying an alternating current (AC) electric signal to a heating loop placed near a specific location on and/or near a piece of metal to be heated. The varying current in the loop creates a varying magnetic flux within the metal to be heated. Current is induced in the metal by the magnetic flux and the internal resistance of the metal causes it to heat up in a relatively short period of time.

Induction heating may be used for many different purposes including curing adhesives, hardening of metals, brazing, soldering, and other fabrication processes in which heat is a necessary or desirable agent. Induction heating may also be used by welding systems for pre-heating and/or post-heating materials.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to apparatus, systems, and methods for maintaining usage logs, such as in an induction heating system, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As utilized herein, the terms "e.g.," and "for example" set off lists of one or more non-limiting examples, instances, or illustrations.

As used herein, a welding-type power supply and/or power source refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, welding-type power refers to power suitable for welding, cladding, plasma cutting, induction heating, CAC-A and/or hot wire welding/preheating (including laser welding and laser cladding), carbon arc cutting or gouging, and/or resistive preheating.

As used herein, an induction head refers to an inductive load such as an induction coil, an induction winding, and/or an induction coil with matching transformer. As used herein, an induction/inductor coil refers to a conductor with current flowing therein, which heats a workpiece by induction. As used herein, an induction/inductor winding includes a winding that induces a magnetic field when current flows therein.

As used herein, an induction power supply refers to a power supply that is capable of providing power to a heating tool, heating element, induction coil, and/or induction head, to induce heat in a (typically metallic) workpiece. As used herein, an induction heating system includes a power source that can provide power for induction heating, and an induction head that can induce heat in a workpiece. As used herein, induction-type power refers to power suitable for a heating tool, heating element, induction coil, and/or induction head, to induce heat in a (typically metallic) workpiece.

As used herein, a pancake spiral pattern for an induction coil is an induction coil wound in a spiral generally in a single plane. As used herein, a stacked spiral pattern for an induction coil is an induction coil wound with multiple spirals, each generally in a plane that is different from the others.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

Some examples of the present disclosure relate to an induction heating system, comprising an induction power source configured to generate induction-type power, an induction heating tool configured to use the induction-type power to perform a heating operation, a memory device attached to the induction heating tool, and a communication device associated with the induction power source. The memory device is configured to store data relating to the induction heating tool, and the communication device is configured to read the data from the memory device using a close proximity communication protocol when the memory device is in close proximity.

In some examples, a user interface is configured to present the data to an operator. In some examples, the memory device is an NFC tag. In some examples, the communication device is an RFID interrogator. In some examples, the data comprises an amount of time the induction heating tool has been in use. In some examples, a user interface is configured to deliver an alert in response to the amount of time meeting or exceeding a threshold. In some examples, the induction heating tool is coupled to the induction power supply through a junction box.

Some examples of the present disclosure relate to an induction heating tool, comprising a coil configured to receive electrical power to perform a heating operation, and a memory device configured to store data relating to the induction heating tool.

In some examples, induction heating tool may further comprise a plug configured for coupling to a port, and a cable having a first end coupled to the plug and a second end coupled to the coil. In some examples, the memory device is positioned in the plug. In some examples, the memory device is positioned adjacent the first end of the cable. In some examples, the memory device comprises an NFC tag. In some examples, the data comprises an amount of time the induction heating tool has been in use.

Some examples of the present disclosure relate to a method, comprising reading data from a memory device associated with an induction heating tool via close proximity communication using a communication device associated with an induction power supply, wherein the induction power supply is configured to provide induction-type power to the induction heating tool.

In some examples, the method further comprises writing data to the memory device via close proximity communication using the communication device. In some examples, the memory device is an RFID tag. In some examples, the communication device is an RFID interrogator. In some examples, the data comprises an amount of time the induction heating tool has been in use. In some examples, the method further comprises delivering a warning if the data meets or exceeds a threshold. In some examples, the method further comprises presenting the data to an operator via a user interface.

Some examples of the present disclosure relate to an induction heating system. The induction heating system may include an induction power supply and an induction heating tool. The induction power supply may be connected to a power source, and may be configured to take in power from the power source and output power capable of being used by the induction heating tool (e.g., induction-type and/or welding-type power). The induction power supply may further include and/or be connected to a junction box. The junction box and/or induction power supply may include one or more ports configured to receive one or more plugs of the induction heating tool.

The induction heating tool may comprise an induction coil and/or an induction winding connected to one or more plugs through one or more cables (and/or conductors, cords, etc.). In some examples, the induction heating tool may comprise an induction head. In some examples, the induction coil and/or winding may be configured in a stacked and/or pancake spiral pattern. Additionally or alternatively, the induction coil and/or winding may be arranged in any customized pattern to fit a particular workpiece and/or weld joint, and/or may be implemented using a fixture for repeatable heating of a consistent type of joint. In some examples, the induction coil and/or induction winding may comprise a Litz wire (e.g., a jacketed Litz wire). In some examples, the induction coil and/or winding may be secured onto and/or into an insulating material (e.g., sewn into an insulating blanket). In some examples, the induction heating tool may be moved by a robotic positioning system in tandem along a welding path together with a conventional welding head, for example a TIG head or any other known type, which "follows" the pre-heating head.

The induction coil and/or induction winding may receive induction power and/or induction coolant (e.g., air and/or liquid) from the induction power supply through one or more cables. The one or more cables may have first ends connected to the induction coils/windings and/or second ends that terminate in one or more plugs. The one or more plugs may be configured for coupling to the one or more ports of the junction box and/or induction power supply. In some examples, the induction heating tool comprises two plugs, both of which must be connected to the junction box and/or induction power supply for the induction heating tool to properly function. In some examples, however, the induction heating tool may include only one plug, and/or only plug of the induction heating tool may need to be connected to the junction box and/or induction power supply for the induction heating tool to properly function. When coupled to the junction box and/or induction power supply, induction heating tool may receive power and/or coolant, so that the induction tool can perform an induction heating operation.

The induction power supply and/or junction box may include a communication device configured for close proximity communication with a memory device of the induction heating tool. In some examples, the communication device may be a Radio-Frequency Identification (RFID) reader/writer, such as an RFID interrogator, for example. The memory device may be an RFID tag (and/or transponder, label, etc.), for example. In some examples, the communication device may be a near field communication (NFC) reader/writer/interrogator, and the memory device may be an NFC tag (and/or transponder, label, etc.). Where the memory device is a tag, the tag may be an active or passive tag.

The communication device may read/write the memory device using a close proximity communication protocol, such as an NFC protocol, an ISO 18000, ISO 14443, ISO 15693, and/or ISO 24730 protocol, for example. In some examples, the communication device may read/write the memory device using some other communications protocol. Advantageously, NFC and/or RFID devices may communicate without actual contact, avoiding the need for physical connectors that could be damaged. Rather, NFC and/or RFID devices communicate via electromagnetic induction, such as between loop antennas within a common near field associated with each NFC and/or RFID enabled device for data transfer. The communication device and/or memory device may include loop antennas to facilitate data transfer via such close proximity communication.

In some examples, the communication device (e.g., RFID/NFC interrogator) may be positioned adjacent to connection ports of the junction box and/or induction power supply. In some examples, more than one communication devices may be used, such as one communication device for each port, for example. The memory device may be positioned in (and/or on, adjacent to, proximate to, etc.) the plugs of the heating tool. In some examples, each plug may be fitted with its own memory device. In some examples, only one plug may have a memory device. In some examples, one or more communication devices may be positioned in other portions of the induction heating tool (e.g., the cable(s) and/or coil/winding).

In some examples, the communication device(s) may be configured to interact (e.g., via close proximity communication) with the memory device(s) of the plug(s) of the induction heating tool when the plugs are connected to the ports of the induction power supply and/or junction box. More particularly, the communication device(s) may be configured to read and/or write data to/from the memory device(s) via close proximity communication. In some examples, the data read and/or written to/from the memory device(s) may include usage log data of the induction heating tool, such as, for example, amount of time used (e.g., number of days, hours, minutes, etc.), location(s) where the tool was used (and/or last used), highest drive current applied, maintenance details (e.g., last maintenance, number of times maintenance performed, etc.), manufacturing details (e.g., date, location, company, etc.), and/or other applicable information. The communication device(s) may further be configured to write to the memory device(s) to update this data. For example, the communication device may increment the amount of time used based on an amount of time the induction heating tool has been in use and/or coupled to the induction power supply and/or junction box. As another example, the communication device may update the location(s) where the induction heating tool was last used and/or the highest drive current applied (if a higher drive current has or is currently been applied).

Data read by the communication device(s) from the memory device(s) may be displayed and/or otherwise indicated to a user via a user interface of the induction heating system. The user interface may be part of and/or connected to the induction power supply. In some examples, the user interface may be a remote interface that communicates with the induction power supply via a wireless communication channel or a wired cable connection. The user interface may comprise one or more display screens, audio speakers, and/or input mechanisms (e.g., keyboard, mouse, microphones, touch screen display, data ports, etc.). The user interface may continually indicate and/or display data read from the memory device(s), or do so in response to user input. The communication device(s) may continually read from the memory device(s) when the two are in proximity, or do so in response to user input. The communication device(s) may write to (and/or update) the memory device(s) in response to input from the user. The data written to the memory device(s) may be provided by the user via the user interface, provided by the induction power supply and/or junction box, and/or provided by some other device coupled to the induction heating system (e.g., via the user interface). For example, the induction power supply may record position data and/or current data which may be used to update the location and/or highest drive current applied data stored in the memory device of the induction heating tool. As a further example, an internal clock of the induction power supply may be used to update the amount of time used data stored in the memory device(s) of the induction heating tool.

In some examples, the user interface may be configured to provide a warning (and/or alert, alarm, feedback, etc.) when the amount of time used data stored in the memory device(s) of the induction heating tool meets and/or exceeds a given threshold. The threshold may be predetermined (e.g., by the induction power supply) and/or based on user input. The warning may be a visual, audio, and/or other type of warning, such as an emphasized visual indication shown on the display screen of the user interface, and/or a klaxon, siren, and/or other sound that may be associated with a warning. The warning may serve to alert a user to maintenance needs of the induction heating tool. In some examples, the amount of time used data may comprise a total amount of time used and an amount of time used since last maintenance. In such an example, the warning may be in response to the amount of time used since last maintenance meets or exceeds a given threshold.

Figure 1:
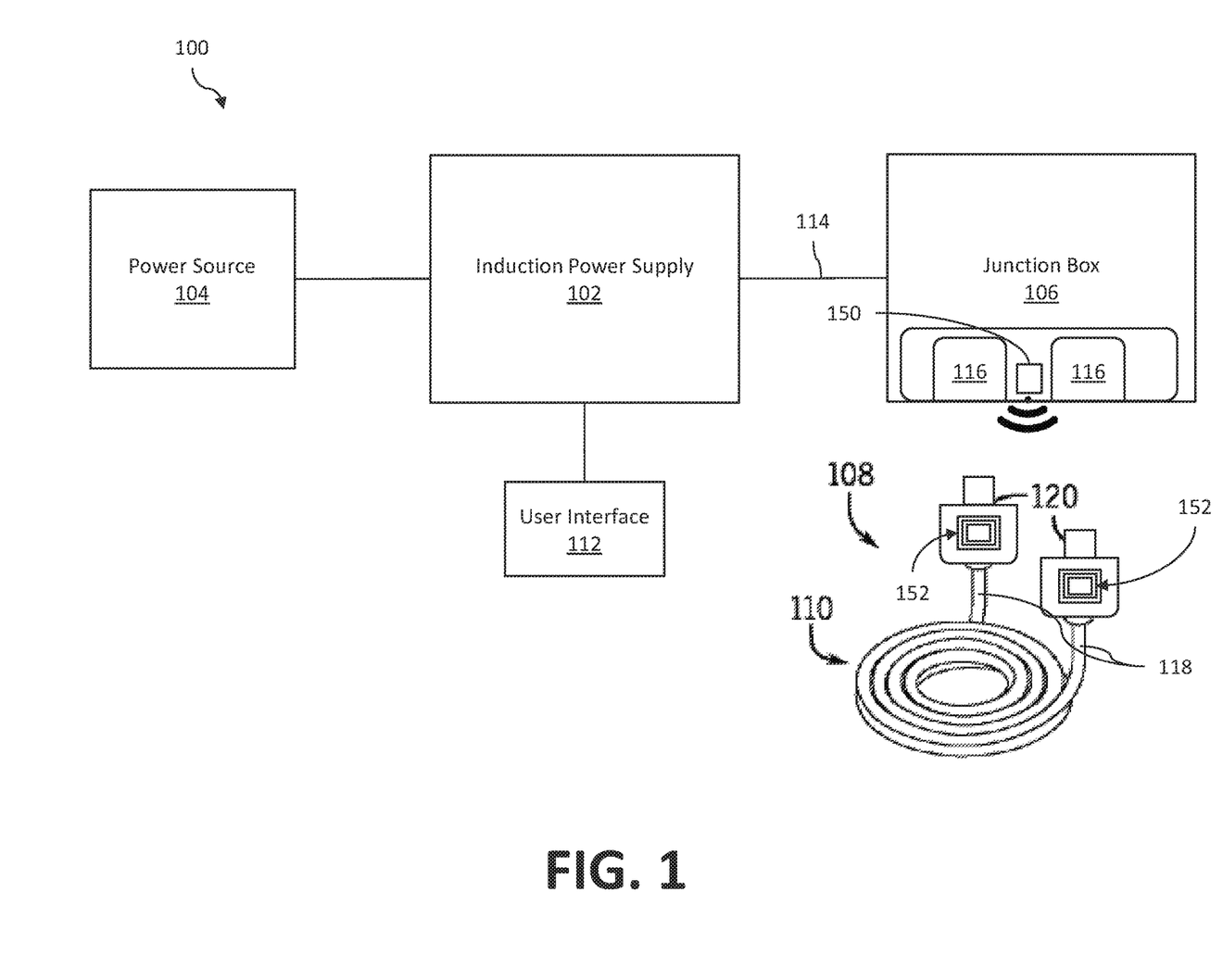
FIG. 1 is a block diagram of an example induction heating system, in accordance with aspects of this disclosure.

FIG. 1 is a block diagram showing an example induction heating system 100, according to aspects of the present disclosure. In the example of FIG. 1, the induction heating system 100 includes an induction power supply 102 coupled to a power source 104 and a junction box 106. The power source 104 may power the induction power supply 102 (e.g., via a generator, battery, main electrical power source, etc.). The induction power supply 102 may be configured to generate AC induction-type power (and/or welding-type power) from the power supplied via the power source 104. In the example of FIG. 1, the junction box 106 is configured for coupling to an induction heating tool 108.

As illustrated in the example of FIG. 1, the induction power supply 102 includes and/or is connected to a user interface 112. In some examples, the user interface 112 may be a remote interface that communicates with the induction power supply 102 via a wireless communication channel or a wired cable connection. The user interface 112 may include input mechanisms, such as buttons, knobs, dials, touch screens, microphones, keyboards, and so forth to allow an operator to regulate various operating parameters of the induction power supply 102. For example, the user interface 112 may be configured to enable an operator to set and adjust a frequency and/or amplitude of the alternating current produced by the induction power supply 102. Similarly, the user interface 112 may enable an operator to select a desired output temperature of an induction tool 108 coupled to the induction power supply 102. The user interface 112 may also include one or more display screens and/or audio speakers configured to provide system feedback to the operator (e.g., real-time temperature of the secondary induction heating coil 110, travel speed of the secondary induction heating coil 110 relative to the workpiece, and so forth).

In the example of FIG. 1, the induction power supply 102 is coupled to a junction box 106, such as through an extension cable 114. In some examples, the junction box 106 may be configured to receive power from the induction power supply 102 through the extension cable 114 and route the power to the induction heating tool 108. In some examples, the junction box 106 may be integrated with (rather than separate from) the induction power supply 102. In the example of FIG. 1, the junction box 106 includes dual ports 116 configured to receive dual plugs 120 of the induction heating tool 108. The ports 116 may facilitate a flow of AC power and/or coolant (e.g., air or liquid) from the junction box 106 (and/or induction power supply 102) through the induction heating tool 108.

In the example of FIG. 1, the induction heating tool 108 includes an induction heating coil 110 (and/or winding) connected to dual plugs 120 through cables 118 (and/or conductors, cords, etc.). The cables 118 may have a hollow core and may also route coolant through the induction heating coil 110. In some examples, the induction coil 110 (and/or winding) may be configured in a stacked and/or pancake spiral pattern. In some examples, the induction coil 110 (and/or winding) may comprise a Litz wire (e.g., a jacketed Litz wire). In some examples, the induction coil and/or winding may be secured onto and/or into an insulating material (e.g., sewn into an insulating blanket). In some examples, the induction heating tool 108 may be moved by a robotic positioning system in tandem along a welding path together with a conventional welding head, for example a TIG head or any other known type, which "follows" the pre-heating head.

Figure 2:
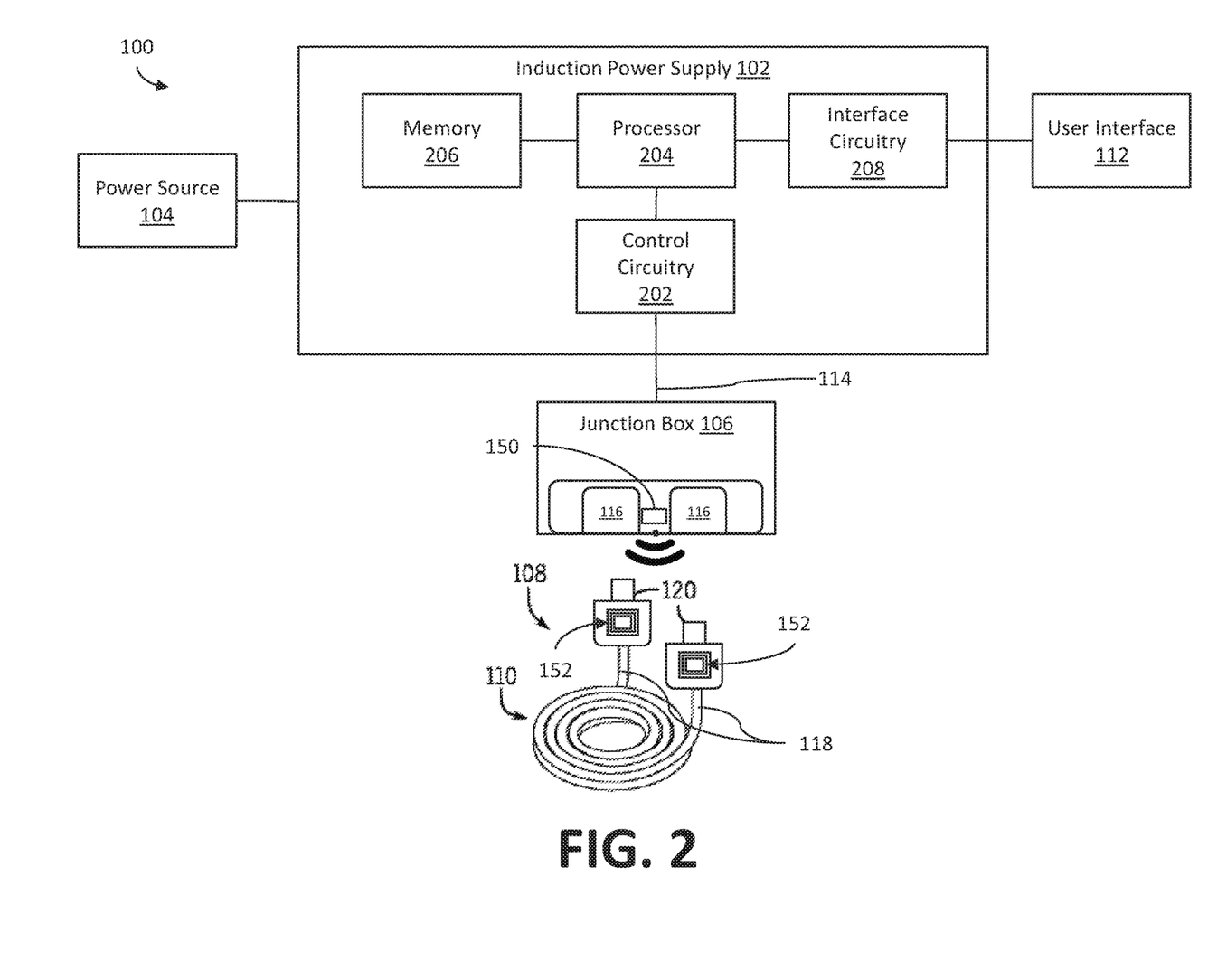
FIG. 2 is a block diagram illustrating functional components of the induction heating system of FIG. 1, in accordance with aspects of this disclosure.

FIG. 2 is a block diagram illustrating certain internal components of the induction heating system 100, in accordance with the present disclosure. As shown in the example of FIG. 2, the induction power supply 102 includes control circuitry 202, one or more processors 204, memory circuitry 206, and interface circuitry 208. As shown, the control circuitry 202 is further coupled to the junction box 106. The control circuitry 202 may be configured to apply control signals to the induction power supply 102 and/or junction box 106. For example, the control circuitry 202 may provide control signals relating to the alternating electrical current (e.g., alternating current frequency and/or amplitude) supplied by the induction power supply 102 to the junction box 106. Additionally, the control circuitry 202 may regulate the operation of a cooling system used with the induction power supply 102 and/or the junction box 106. As mentioned above, the induction heating system 100 may use air or a coolant to provide circulating cooling throughout the induction heating system 100. For example, the control circuitry 202 may regulate a flow of a liquid coolant through the junction box 106 and/or the induction heating coil 110 to maintain a desired temperature of the induction heating system 100.

The control circuitry 202 is further coupled to the processor(s) 204, memory circuitry 206, and interface circuitry 208. The interface circuitry 208 is coupled to the user interface 112 of the induction power supply 102. As mentioned above, the user interface 112 of the induction power supply 102 enables an operator to regulate one or more operating parameters or settings of the induction heating system 100. For example, the user interface 112 may enable an operator to select a particular operation and/or configuration of the induction heating power supply 102. As will be appreciated, different operations and/or configurations may have different maximum/minimum operating temperatures, and/or may require different frequencies and/or amplitudes of alternating current to achieve a desired temperature. Similarly, the coolant used to cool the induction heating tool 108 may have different parameters (e.g., heat transfer coefficients, viscosities, flow rates, and so forth). Preset values for such configuration parameters, as well as others, may be stored in the memory circuitry 206. For example, the user interface 112 may communicate an operator selection to the interface circuitry 208, which may communicate the selection to the processor(s) 204. The processor(s) 204 may then retrieve the particular configuration parameters stored in the memory circuitry 206. Thereafter, the processor(s) 204 may send the configuration parameters to the control circuitry 202 in order that the control circuitry 202 may apply appropriate control signals to the induction power supply 102 and/or the junction box 106.

In the examples of FIGS. 1 & 2, the junction box 106 includes a communication device 150 configured for close proximity communication with memory devices 152 of the induction heating tool 108. In some examples, the communication device 150 may be part of the induction power supply 102 rather than, or in addition to, the junction box 106. In some examples, the communication device 150 may be a Radio-Frequency Identification (RFID) reader/writer, such as an RFID interrogator, for example. In some examples, the memory devices 152 may be RFID tags (and/or transponders, labels, etc.), for example. In some examples, the communication device 150 may be a near field communication (NFC) reader/writer/interrogator, and/or the memory device 152 may be an NFC tag (and/or transponder, label, etc.). Where the memory device 152 is a tag, the tag may be an active or passive tag.

In some examples, the communication device 150 may read/write the memory devices 152 using a close proximity communication protocol, such an ISO 18000, ISO 14443, ISO 15693, and/or ISO 24730 protocol, for example. In some examples, the communication device 150 may read/write the memory device 152 using some other communications protocol. Advantageously, NFC and/or RFID devices can communicate without actual contact, avoiding the need for physical connectors that could be damaged. Rather, NFC and/or RFID devices communicate via electromagnetic induction, such as between loop antennas within a common near field associated with each NFC and/or RFID enabled device for data transfer. The communication device 150 and/or memory device 152 may include loop antennas (and/or other type of antennas) to facilitate data transfer via close proximity communication. In some examples, the communication device 150 and/or memory devices 152 may use Bluetooth technology in addition to, or rather than, RFID/NFC.

In the examples of FIGS. 1 & 2, the communication device 150 (e.g., RFID/NFC interrogator) is positioned adjacent to connection ports 116 of the junction box 106. In some examples, more than one communication device 150 may be used, such as one communication device 150 for each port 116, for example. In the examples of FIGS. 1 & 2, the memory devices 152 are positioned in (and/or on, adjacent to, proximate to, etc.) the plugs 120 of the induction heating tool 108. In some examples, each plug 120 may be fitted with its own memory device 152, so as to provide some redundancy to the induction heating system 100. In some examples, only one plug 120 may have a memory device 152. In some examples, one or more communication devices 150 and/or memory devices 152 may be positioned in other portions of the induction heating tool 108 (e.g., the cable(s) 118 and/or coil/winding 110), and/or in other portions of the induction power supply 102 and/or junction box 106.

In some examples, the communication device 150 may be configured to interact (e.g., via close proximity communication) with the memory devices 152 of the plugs 120 of the induction heating tool 108 when the plugs 120 are connected to the ports 116 of the junction box 106. More particularly, the communication device 150 may be configured to read and/or write data to/from the memory devices 152 via close proximity communication. The data read from the memory devices 152 may be stored in memory 206 and/or presented to the operator via the user interface 112.

In some examples, the communication device 150 may be in communication with the induction power supply 102, such as the control circuitry 202 and/or processor(s) 204. In some examples, the communication device 150 may be a "smart" reader/writer/interrogator, having built-in intelligence, and allowing the communication device 150 to not only read/write data, but also make decisions/determinations based on the read/write data, process the data, and/or perform certain tasks with the data. In some examples, the communication device 150 may be a "dumb" reader/writer/interrogator that relies on the induction power supply 102 to perform the tasks of the induction heating system 100. While the present disclosure may describe certain operations undertaken by the components of the induction power supply 102 to make decisions/determinations based on the read/write data, process the data, and/or perform certain tasks with the data, in some examples these operations may alternatively, or additionally, be performed by a "smart" communication device 150.

In some examples, the data read and/or written to/from the memory devices 152 may include usage log data of the induction heating tool, such as, for example, amount of time used (e.g., number of days, hours, minutes, etc.), location(s) where the tool was used (and/or last used), highest drive current applied, maintenance details (e.g., last maintenance, number of times maintenance performed, etc.), manufacturing details (e.g., date, location, company, etc.), and/or other information. The communication device 150 may further be configured to write to the memory devices 152 to update this data. For example, the communication device 150 may increment the amount of time used based on an amount of time the induction heating tool 108 has been in use and/or coupled to the induction heating power supply and/or junction box. In such an example, the processor(s) 204 may maintain and/or use an internal clock to measure an elapsed time. Further, the processor(s) 204 may maintain a time-stamped record in memory 206 corresponding to the time(s) when the induction heating tool 108 has been operational and/or coupled to the junction box 106. The junction box 106 may send one or more signals to the processor(s) 204 through the control circuitry 202 to indicate when one or both of the plugs 120 are coupled to the ports 116. The communication device 150 may additionally, or alternatively, send one or more signals to the processor(s) 204 to indicate when one or both of the plugs 120 are in close enough proximity to be read by the communication device 150. The processor(s) 204 may further communicate with the control circuitry 202 and/or junction box 106 to determine if power and/or coolant is being routed to the heating tool 108 to determine if the heating tool 108 is being used. The processor(s) 204 may use all of this information in determining if and/or how much the communication device 150 should increment the amount of time used data stored on the memory devices 152.

As another example, the communication device 150 may update the location(s) where the induction heating tool 108 was last used and/or the highest drive current applied (if a higher drive current has or is currently been applied). In determining whether and/or how to update the location data, the processor(s) 204 may access location data of the induction power supply 102 (e.g., Global Positioning System data, user input location data, and/or other data). In determining whether and/or how to update highest drive current applied, the processor(s) 204 may determine how much drive current is being (and/or has recently been) drawn by, used by, and/or applied to the induction heating tool 108.

Data read by the communication device 150 from the memory device 152 may be displayed and/or otherwise indicated to the operator via the user interface 112 of the induction heating system 100. The communication device 150 may write to (and/or update) the memory devices 152 in response to input from the user. The data written to the memory devices 152 may be provided by the operator via the user interface 112, provided by the induction heating power supply 102, provided by the junction box 106, and/or provided by some other device coupled to the induction heating system 100 (e.g., via the user interface 112).

In some examples, the user interface 112 may be configured to provide a warning (and/or alert, alarm, feedback, etc.) when the amount of time used data stored in the memory device 152 of the induction heating tool 108 meets and/or exceeds a given threshold. The threshold may be predetermined (e.g., by the induction heating power supply) and/or based on user input. The user interface 112 may further be configured to provide a warning (and/or alert, alarm, feedback, etc.) when other data stored in the memory device 152 of the induction heating tool 108 meets and/or exceeds a given threshold (e.g., amount of time since manufacture, highest current, amount of time since last maintenance, etc.). The warning may be a visual, audio, and/or other type of warning, such as an emphasized visual indication shown on the display screen of the user interface, and/or a klaxon, siren, and/or other sound that may be associated with a warning. The warning may serve to alert a user to maintenance needs of the induction heating tool. In some examples, the amount of time used data may comprise a total amount of time used and an amount of time used since last maintenance. In such an example, the warning may be in response to the amount of time used since last maintenance meets or exceeds a given threshold.

Figure 3:
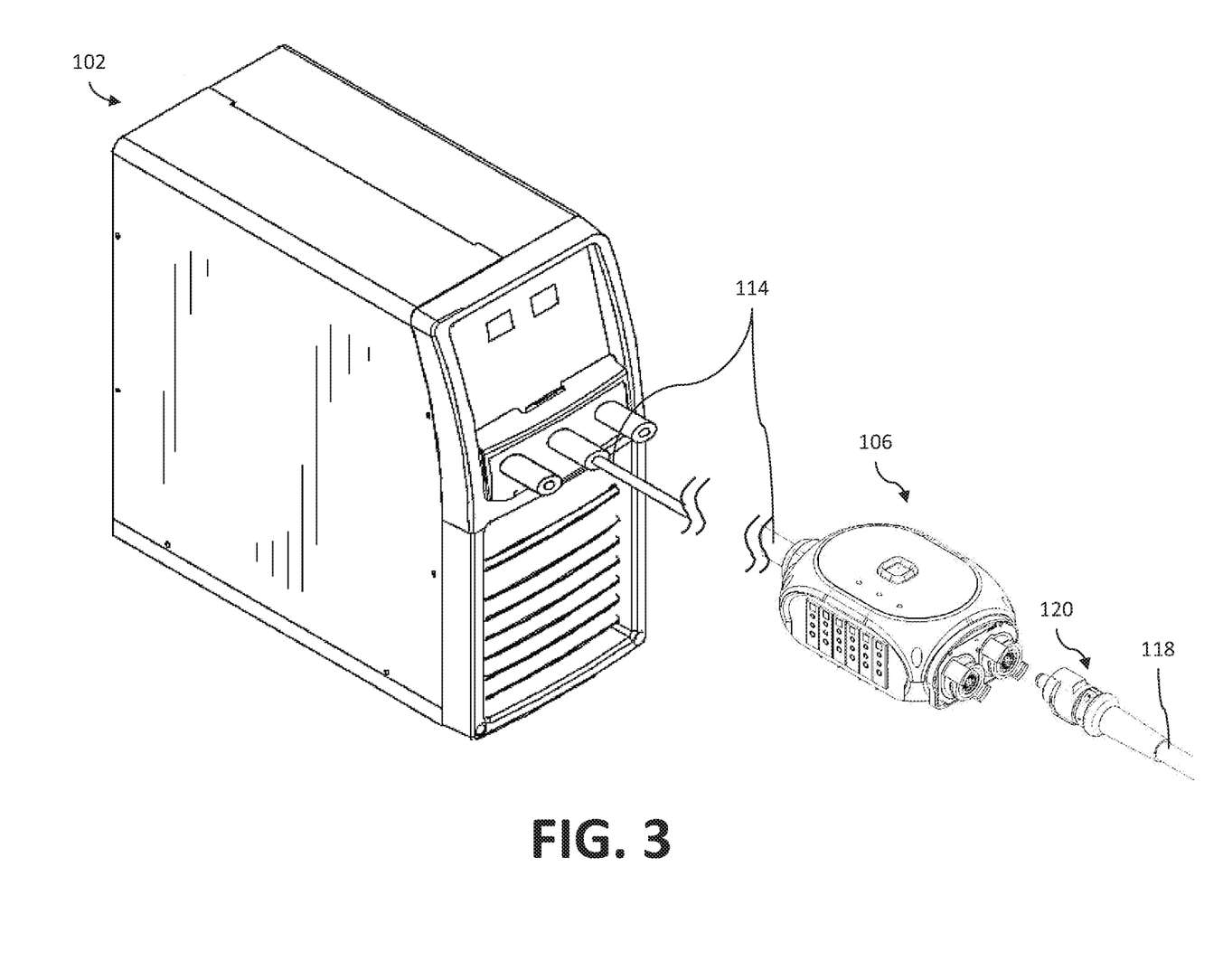
FIG. 3 is a perspective view of components that may be used in the induction heating system of FIG. 1, in accordance with aspects of this disclosure.
Figure 4:
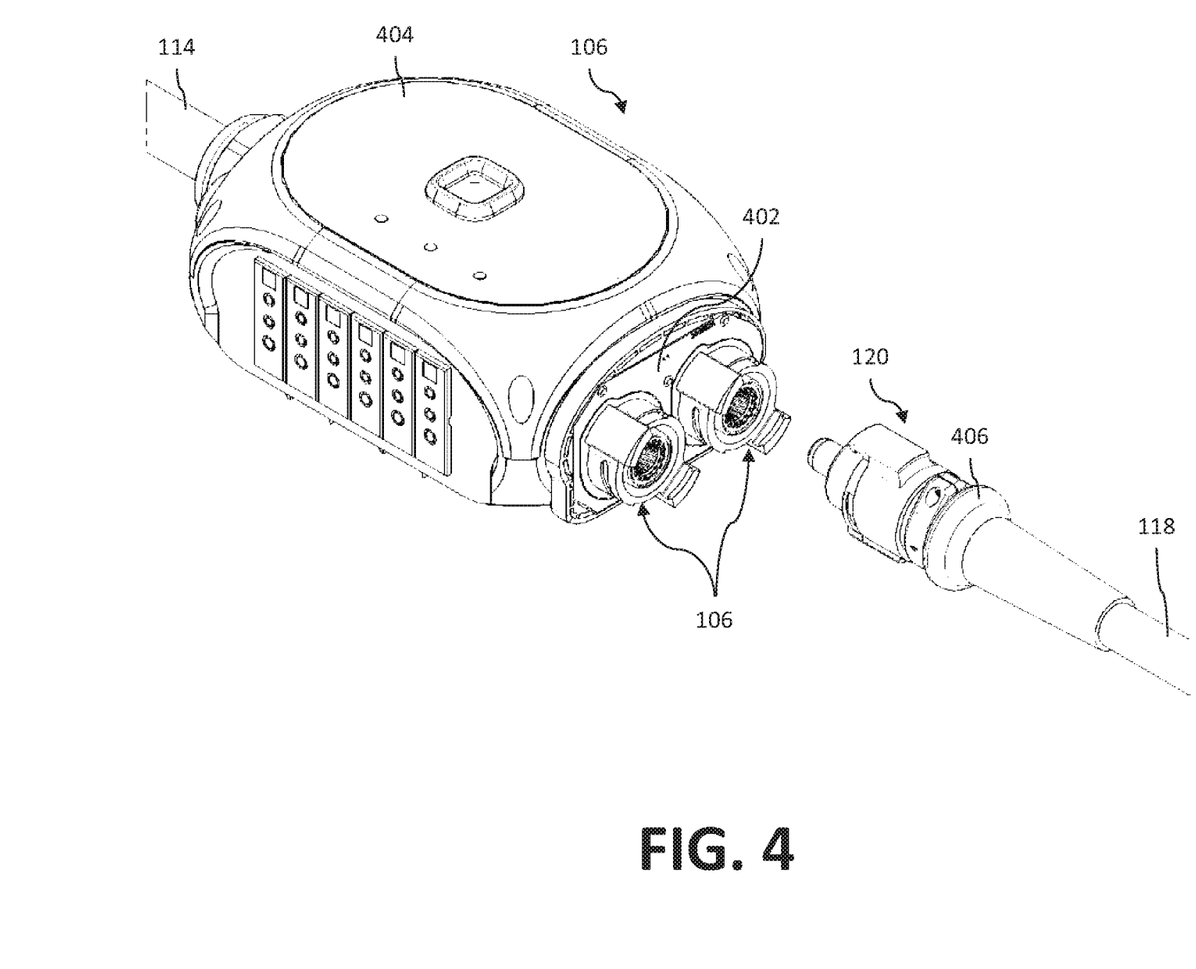
FIG. 4 is a perspective view of a junction box, a heating tool cable, and a heating tool plug that may be used in the induction heating system of FIG. 1, in accordance with aspects of this disclosure.

FIG. 3 shows a perspective view of the induction power supply 102 and junction box 106. The cable 118 and plug 120 of the induction heating tool 108 is also shown. FIG. 4 is an enlarged depiction of the junction box 106, and the cable 118 and plug 120 of the induction heating tool 108. While the examples of FIGS. 3 & 4 show only one plug 120 and one cable 118, it should be understood that another plug 120 and/or cable 118 may be included in the induction heating system 100.

As shown in the example of FIG. 4, a panel 402 is positioned behind the ports 106, between the ports 106 and the main body 404 of the junction box 106. In some examples, the communication device 150 may be positioned behind the panel 402, with the antennas of the communication device 150 extending around the perimeter of the panel 402 and/or the ports 116 so as to enable close proximity communication with memory devices 152 of plugs 120 being coupled to either port 116. In some examples, the communication device 150 may be positioned in the body 404 of the junction box 106, on the outside of the ports 116 themselves, and/or in other appropriate positions. In some examples, the memory devices 152 may be positioned in/on a disc 406 that encircles the cable 118 at the end of the cable 118 that connects to the plug 120. The disc 406 may include a hole through which the cable 118 extends to couple to the plug 120. In some examples, the memory devices 152 may additionally, or alternatively, be positioned in/on the plugs 120 themselves, in/on the cables 118 themselves, and/or in other portions of the induction heating tool 108.

Figure 5:
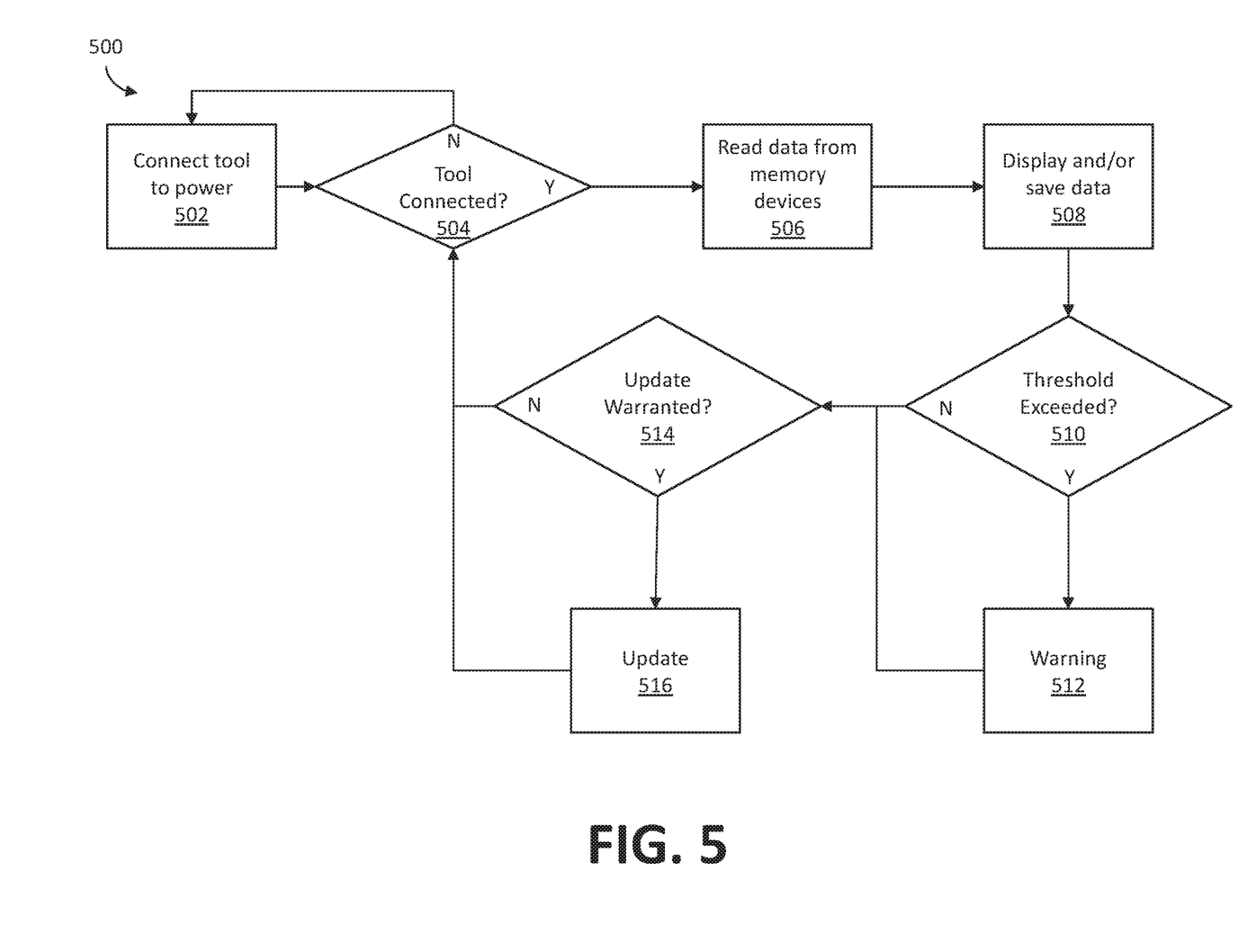
FIG. 5 is a block diagram of an example operation of the induction heating system of FIG. 1, in accordance with aspects of this disclosure.

FIG. 5 shows an example control process 500 of the induction heating system 100. In some examples, some or all of the control process 500 may be implemented in machine readable instructions stored in memory 206 and/or executed by the one or more processors 204. In some examples, some or all of the control process 500 may be implemented in analog and/or discrete circuitry (e.g., control circuitry 202). In some examples, some or all of the control process 500 may be implemented via one or more "smart" communication devices 150.

In the example of FIG. 5, the control process 500 begins at block 502 the induction heating tool 108 is connected to the power supply 102 and/or junction box 106 using ports 116 and plugs 120. At block 504, a determination is made whether the tool 108 is connected. If the tool 108 is not connected, the control process 500 goes back to block 502. If the tool 108 is connected, the control process 500 proceeds to block 506. In some examples, the junction box 106 and/or power supply 102 may be configured to detect if/when the tool 108 is connected (e.g., if/when one or both plugs 120 are connected to the ports 116). In some examples, blocks 502 and/or 504 may be skipped entirely, and operation may begin (and/or end) at block 506. In some examples, block 504 may comprise an additional, or alternative, determination as to whether the memory devices 152 of the tool 108 are in close enough proximity to the communication device 150 for read and/or write operations to occur, and the operation may proceed to block 504 if so. In some examples, the control process 500 may prevent operation of the tool 108 (and/or power transfer from the induction power supply 102 to the tool 108) unless the memory devices 152 and communication device 150 are in close enough proximity for read and/or write operations.

At block 506, the communication device 150 reads data from the memory devices 152 using close proximity communication (e.g., NFC). At block 508, the data is saved in memory 206 and/or presented to the operator via the user interface 112. At block 510, the power supply 102 and/or communication device 150 determines if the some or all of the data meets and/or exceeds one or more thresholds. If so, a warning is presented to the operator at block 512. In some examples, the control process 500 may additionally, or alternatively, disable power production of the induction power supply 102, and/or disable power transfer to the induction heating tool 108 at block 512.

In the example of FIG. 5, the If not, (or after the warning if so), the control process 500 proceeds to block 514 after block 512 (or after block 510 if the one or more thresholds are not met or exceeded). At block 514, the power supply 102 and/or communication device 150 determines if an update to the data stored in the memory devices 152 is warranted. If so, the communication device 150 updates the data at block 516. If not (or after the update if so), the control process 500 returns to block 504.

The present methods and systems may be realized in hardware, software, and/or a combination of hardware and software. Example implementations include an application specific integrated circuit and/or a programmable control circuit.

While the present apparatuses, systems, and/or methods have been described with reference to certain implementations, it will be understood by those skilled in the art that various changes may be made and equivalents may be substituted without departing from the scope of the present apparatuses, systems, and/or methods. In addition, many modifications may be made to adapt a particular situation or material to the teachings of the present disclosure without departing from its scope. Therefore, it is intended that the present apparatuses, systems, and/or methods not be limited to the particular implementations disclosed, but that the present apparatuses, systems, and/or methods will include all implementations falling within the scope of the appended claims.

What is claimed is:

1. An induction heating system, comprising:
    an induction power source configured to generate induction-type power;
    an induction heating tool configured to use the induction-type power to perform a heating operation;
    a memory device attached to the induction heating tool, wherein the memory device is configured to store data relating to the induction heating tool; and
    a communication device associated with the induction power source, wherein the communication device is configured to read the data from the memory device using a close proximity communication protocol when the memory device is in close proximity, wherein the data comprises an amount of time the induction heating tool has been in use, and wherein a user interface is configured to deliver an alert in response to the amount of time meeting or exceeding a threshold.

2. The induction heating system of claim 1, further comprising a port of the induction power source, or of a junction box in electrical communication with the induction power source, the port being configured for an electrical connection with the induction heating tool, the induction heating tool configured to receive the induction-type power through the electrical connection with the port, the communication device being retained proximate the port, and the memory device being attached to the induction heating tool such that the memory device is in close proximity to the communication device when the electrical connection is established between the induction heating tool and the port.

3. The induction heating system of claim 1, wherein the memory device is an NFC tag, and the communication device is an NFC interrogator.

4. The induction heating system of claim 1, wherein the memory device is an RFID tag, and the communication device is an RFID interrogator.

5. The induction heating system of claim 1, wherein the induction heating tool includes an electrically conductive portion configured to conduct the induction-type power to perform the heating operation, the memory device being electrically insulated from the electrically conductive portion.

6. The induction heating system of claim 2, further comprising control circuitry configured to
- determine whether the electrical connection has been established between the induction heating tool and the port,
- in response to determining the electrical connection has been established, track an amount of time the electrical connection between the induction heating tool and the port is maintained, the communication device being configured to update the data stored by the memory device, using the close proximity communication protocol, based on the amount of time.

7. A method, comprising:
- storing data relating to an induction heating tool in a memory device attached to the induction heating tool, the data comprising an amount of time the induction heating tool has been in use:
- reading the data from the memory device via close proximity communication using a communication device associated with an induction power supply, wherein the induction power supply is configured to generate induction-type power and provide the induction-type power to the induction heating tool, the induction heating tool configured to use the induction-type power to perform a heating operation; and
- delivering an alert in response to the amount of time the induction heating tool has been in use meeting or exceeding a threshold.

8. The method of claim 7, further comprising writing data to the memory device via close proximity communication using the communication device.

9. The method of claim 7, wherein the memory device is an RFID tag.

10. The method of claim 7, wherein the communication device is an RFID interrogator.

11. The method of claim 7, wherein the induction heating tool includes an electrically conductive portion configured to conduct the induction-type power to perform the heating operation, the memory device being electrically insulated from the electrically conductive portion.

12. The method of claim 7, wherein the memory device is an NFC tag.

13. The method of claim 7, wherein the communication device is an NFC interrogator.

14. An induction heating system, comprising:
- an induction power source configured to generate induction-type power;
- an induction heating tool configured to use the induction-type power to perform a heating operation;
- a port of the induction power source, or of a junction box in electrical communication with the induction power source, the port being configured for an electrical connection with the induction heating tool, and the induction heating tool configured to receive the induction-type power through the electrical connection with the port;
- a memory device attached to the induction heating tool, wherein the memory device is configured to store data relating to the induction heating tool; and
- a communication device associated with the induction power source, the communication device being retained proximate the port, and the memory device being attached to the induction heating tool such that the memory device is in close proximity to the communication device when the electrical connection is established between the induction heating tool and the port, wherein the communication device is configured to read the data from the memory device using a close proximity communication protocol when the memory device is in close proximity.

15. The induction heating system of claim 14, further comprising control circuitry configured to:
- determine whether the electrical connection has been established between the induction heating tool and the port, and
- in response to determining the electrical connection has been established, track an amount of time the electrical connection between the induction heating tool and the port is maintained, the communication device being configured to update the data stored by the memory device, using the close proximity communication protocol, based on the amount of time.

16. The induction heating system of claim 14, wherein the memory device is an NFC tag, and the communication device is an NFC interrogator.

17. The induction heating system of claim 14, wherein the memory device is an RFID tag, and the communication device is an RFID interrogator.

18. The induction heating system of claim 14, wherein the data comprises an amount of time the induction heating tool has been in use, and wherein a user interface is configured to deliver an alert in response to the amount of time meeting or exceeding a threshold.

19. The induction heating system of claim 14, wherein the induction heating tool includes an electrically conductive portion configured to conduct the induction-type power to perform the heating operation, the memory device being electrically insulated from the electrically conductive portion.

* * * * *